United States Patent [19]

Harlan et al.

[11] Patent Number: 5,787,988
[45] Date of Patent: Aug. 4, 1998

[54] FOLDING SEED PLANTER

[75] Inventors: Robert Dale Harlan, Hanover; Donald R. Landoll, Marysville, both of Kans.

[73] Assignee: Landoll Corporation, Marysville, Kans.

[21] Appl. No.: 657,813

[22] Filed: May 31, 1996

[51] Int. Cl.$^6$ .................................................. A01B 49/00
[52] U.S. Cl. ............................................ 172/311; 172/456
[58] Field of Search ................................. 172/310, 311, 172/456, 457, 458, 467, 315, 316, 329; 111/57, 52; 91/361, 397

[56] References Cited

U.S. PATENT DOCUMENTS

| | | | |
|---|---|---|---|
| 4,098,346 | 7/1978 | Stanfill et al. | 172/283 |
| 4,171,022 | 10/1979 | Applequist . | |
| 4,664,202 | 5/1987 | Applequist et al. . | |
| 5,232,054 | 8/1993 | Van Blaricon et al. . | |
| 5,449,042 | 9/1995 | Langphair et al. | 172/311 X |
| 5,488,996 | 2/1996 | Barry et al. | 172/311 |
| 5,511,458 | 4/1996 | Kamata et al. | 91/361 |
| 5,647,440 | 7/1997 | Barry et al. | 172/311 |

OTHER PUBLICATIONS

White Brochure on 6000 Series Planters; Form No. LT92PL.078. White–New Idea Farm Equipment Co., Front and Back Cover Sheets, pp. 4 and 5 (1992).

Best Brochure on "Best Line" Conventional/No–till Grain Drill, Best Manufacturung, Inc., Jonesboro, AR (Publication prior to Feb. 23, 1993).

Marliss Brochure on 30' Folding No–till Drill No. 3–93–5M Starr, Marliss, Jonesboro, AR (Publication prior to Sep. 17, 1993).

Great Plains Brochure on 24' and 30' Folding No–till Drill, Form No. GPFNT 4GL 5C, Great Plains Manufacturing , Inc., Assaria, KS (Publication prior to Sep. 17, 1992).

Great Plains on 30'& 40' Multi–Flex Drills, Great Plains, Manufacturing, Inc., Assaria, KS, Front and Back Cover Sheete, pp. 1 and 10 (Publication prior to Jul. 13, 1990).

(List continued on next page.)

*Primary Examiner*—Terry Lee Melius
*Assistant Examiner*—Robert Pezzuto
*Attorney, Agent, or Firm*—Hovey, Williams, Timmons & Collins

[57] ABSTRACT

A folding planter includes a frame formed by first and second frame members supported for relative, longitudinal shifting movement, a primary fluid-actuated piston and cylinder assembly for shifting the first and second frame members between retracted and extended positions, and a pair of planter assemblies each supported on the second frame member for pivotal movement about a vertical pivot axis between an extended planting position and a retracted transport position. Each planter assembly includes a tool bar that extends transverse to the longitudinal axis of the frame in the planting position and parallel to the frame in the transport position, and a plurality of planting units supported on the tool bar. A pair of elongated trusses are connected between the first frame member and the planter assemblies. Each truss presents opposed ends supported for pivotal movement relative to the first frame member and one of the planter assemblies to permit the planter assembly to be moved between the planting and transport positions upon actuation of the primary piston and cylinder assembly. A mechanical linkage is connected to the primary piston and cylinder assembly and to the planter assemblies for driving pivotal movement of the planter assemblies upon actuation of the primary piston and cylinder assembly to assist the trusses in moving the planter assemblies completely into and out of the transport position.

10 Claims, 6 Drawing Sheets

OTHER PUBLICATIONS

Marliss Brochure on 40' Folding Drill, Form No. 3935 MCMI, Marliss, AR, Jonesboro, AR (Publication prior to Sep. 17, 1993).

DuraTech Brochure on 2575 Golding No–till Drill, Dura Tech, Jamestown, N.D. (Publication prior to Feb. 26, 1996).

MaxEmerge 2® Planters Brochure, Form No. DKA140, John Deere, Front and Back Cover Sheets, pp. 12, 13, 14, and 15 (Publication prior to Sep. 29, 1995).

Kinze Brochure on 2000 Series Planters, Form No. PL 1–95, Kinze Manufacturing, Inc., Williamsburg, Iowa, Front and Back Cover Sheets, pp. 34, 35, 36 and 37 (Publication prior to Feb. 27, 1995).

Brochure for CrustBuster® Foldn Tow Silver Trash Shank Drills–3400 Series, Crust–Buster, Inc., Spearville, KS (Publication prior to Feb. 26, 1985).

CrustBuster® Brochure on Grass Drills, CrustBuster, Inc., Spearsville, KS (Publication prior to Feb. 23, 1988).

FOLDING SEED PLANTER

BACKGROUND OF THE INVENTION

1. Field of the Invention

The present invention relates generally to agricultural equipment, and more particularly to a seed planter that can be folded for transport and storage.

2. Discussion of the Prior Art

It is known to provide a planter that is capable of being folded to a transport position. Such a planter includes a frame supported on a set of ground-engaging wheels and adapted for attachment to a towing implement such as a tractor or the like, and a pair of planter assemblies each including a tool bar and a plurality of planter units supported on the tool bar. The tool bars are supported on the frame for relative swinging movement between a planting position in which the tool bars extend generally transverse to the frame, and a transport position in which they are generally parallel to the frame. A pair of fluid-actuated piston and cylinder assemblies are provided for moving the planter assemblies between the planting and transport positions, wherein each piston and cylinder assembly is connected between the frame and one of the tool bars for moving the respective planter assembly.

Because the piston and cylinder assemblies are mounted externally of the frame and tool bars in the conventional construction, they prevent the planter assemblies from swinging to a transport position in which the tool bars are completely parallel with the frame, and take up space on the tool bars that restricts placement of the planter units.

OBJECTS AND SUMMARY OF THE INVENTION

It is an object of the present invention to provide a folding planter having an improved construction which employs a single primary piston and cylinder assembly for driving movement of a pair of planter assemblies between the planting and transport positions.

It is another object of the present invention to provide a planter unit that presents a profile in the transport position that is narrower than the profile presented by conventional planters, and provides a pair of tool bars that are relatively free of obstruction so that planter units can be supported at regular intervals along the tool bars without requiring custom hardware.

In accordance with this and other objects evident from the following description of a preferred embodiment of the invention, a folding planter is provided with a frame including first and second frame members supported for relative, longitudinal shifting movement, a primary fluid-actuated piston and cylinder assembly for shifting the first and second frame members between retracted and extended positions, and a pair of planter assemblies each supported on the second frame member for pivotal movement about a vertical pivot axis between a planting position and a transport position.

Each planter assembly includes a tool bar that extends transverse to the longitudinal axis of the frame in the planting position and parallel to the frame in the transport position, and a plurality of planting units supported on the tool bar. A pair of elongated trusses are connected between the first frame member and the planter assemblies, wherein each truss presents opposed ends supported for pivotal movement relative to the first frame member and one of the planter assemblies to permit the planter assembly to be moved by the truss between the planting and transport positions upon actuation of the primary piston and cylinder assembly. A mechanical linkage is connected to the primary piston and cylinder assembly and to the planter assemblies for driving pivotal movement of the planter assemblies upon actuation of the primary piston and cylinder assembly to assist the trusses in moving the planter assemblies completely into and out of the transport position.

By providing a planter in accordance with the present invention, numerous advantages are realized. For example, by providing a single primary piston and cylinder assembly that is connected to the planter assemblies by a mechanical linkage, it is possible to drive movement of both planter assemblies between the planting and transport positions with a single piston and cylinder assembly. This construction reduces the number of piston and cylinder assemblies required to operate the planter, and frees up space on the planter so that it presents a narrower profile in the transport position than the conventional construction.

In addition, the inventive construction permits placement of the primary piston and cylinder assembly within the frame so that the assembly is protected from exposure to the elements and does not interfere with the placement of planter units on the tool bars of the planter assemblies.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figures 1, 12:
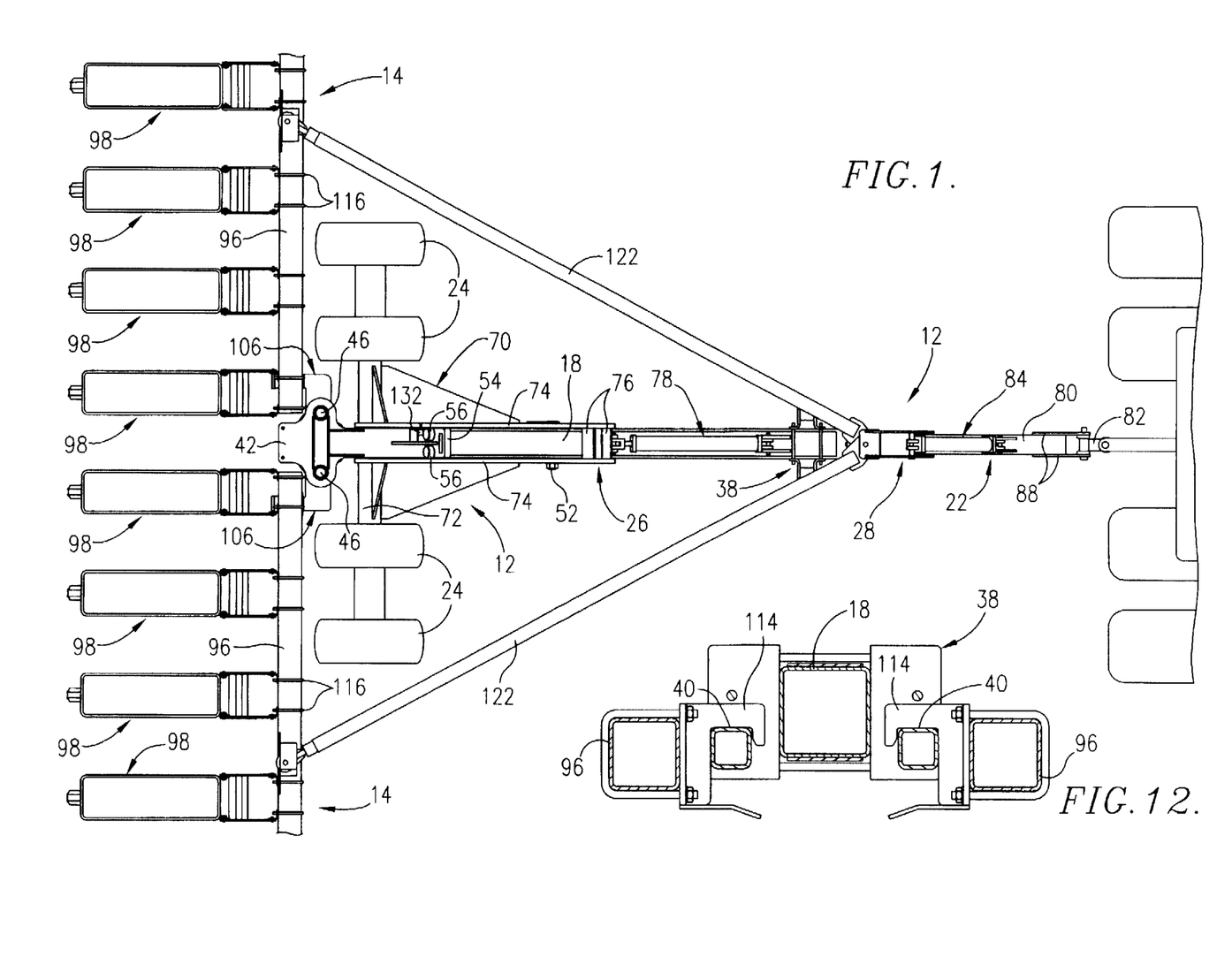
FIG. 1 is a fragmentary top plan view of a planter constructed in accordance with the preferred embodiment, illustrating the planter in a planting position.
FIG. 12 is a sectional view taken along line 12—12 of FIG. 5.
Figure 2:
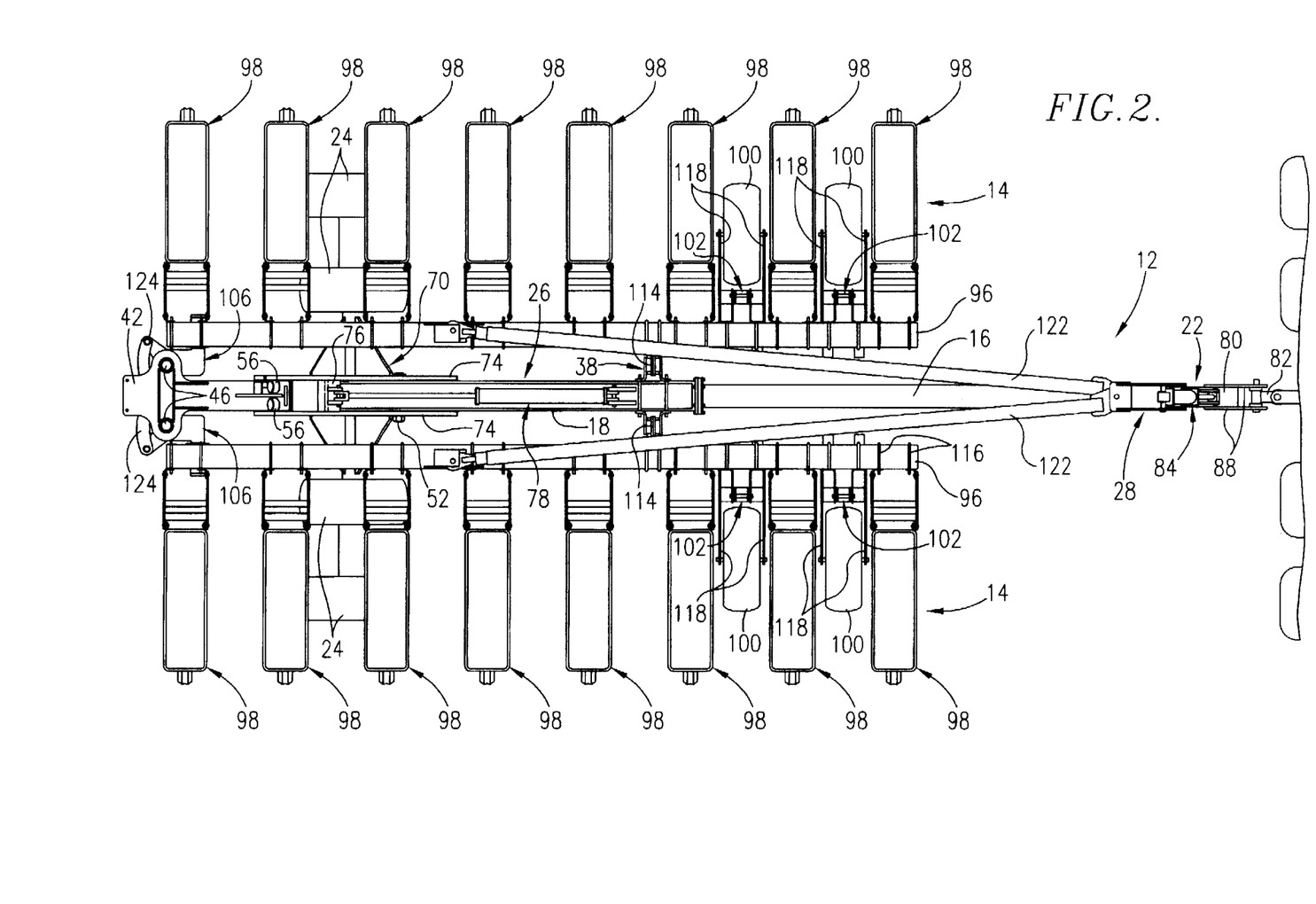
FIG. 2 is a top plan view of the planter in a transport position.

A planter constructed in accordance with the preferred embodiment is shown in FIG. 1, and broadly includes an elongated frame 12 adapted for attachment to a towing implement such as a tractor or the like, and a pair of planter assemblies 14 connected to the frame and movable between a planting position shown in FIG. 1 and a transport position, illustrated in FIG. 2.

The frame includes inner and outer tubular frame members 16, 18, a piston and cylinder assembly 20 for shifting the frame members between extended and retracted positions, and a hitch assembly 22 by which the frame is connected to the tractor. In addition, a set of ground-engaging wheels 24 are provided along with a wheel lift assembly 26 for lifting and lowering the frame on the wheels.

Figure 3:
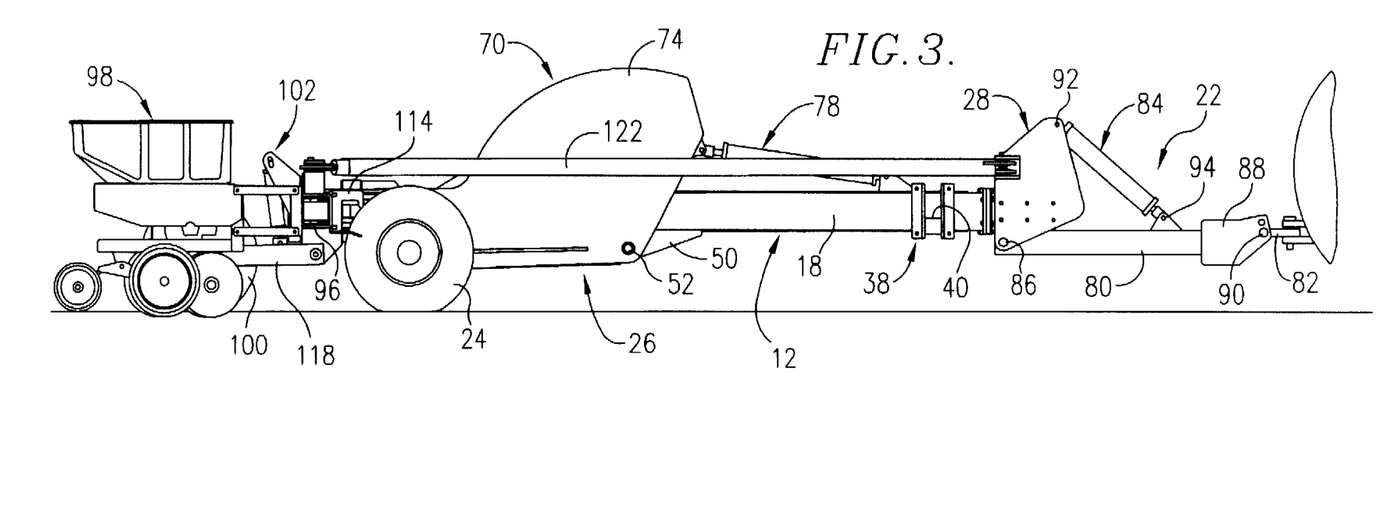
FIG. 3 is a side elevational view of the planter in the planting position.
Figures 6, 7, 8:
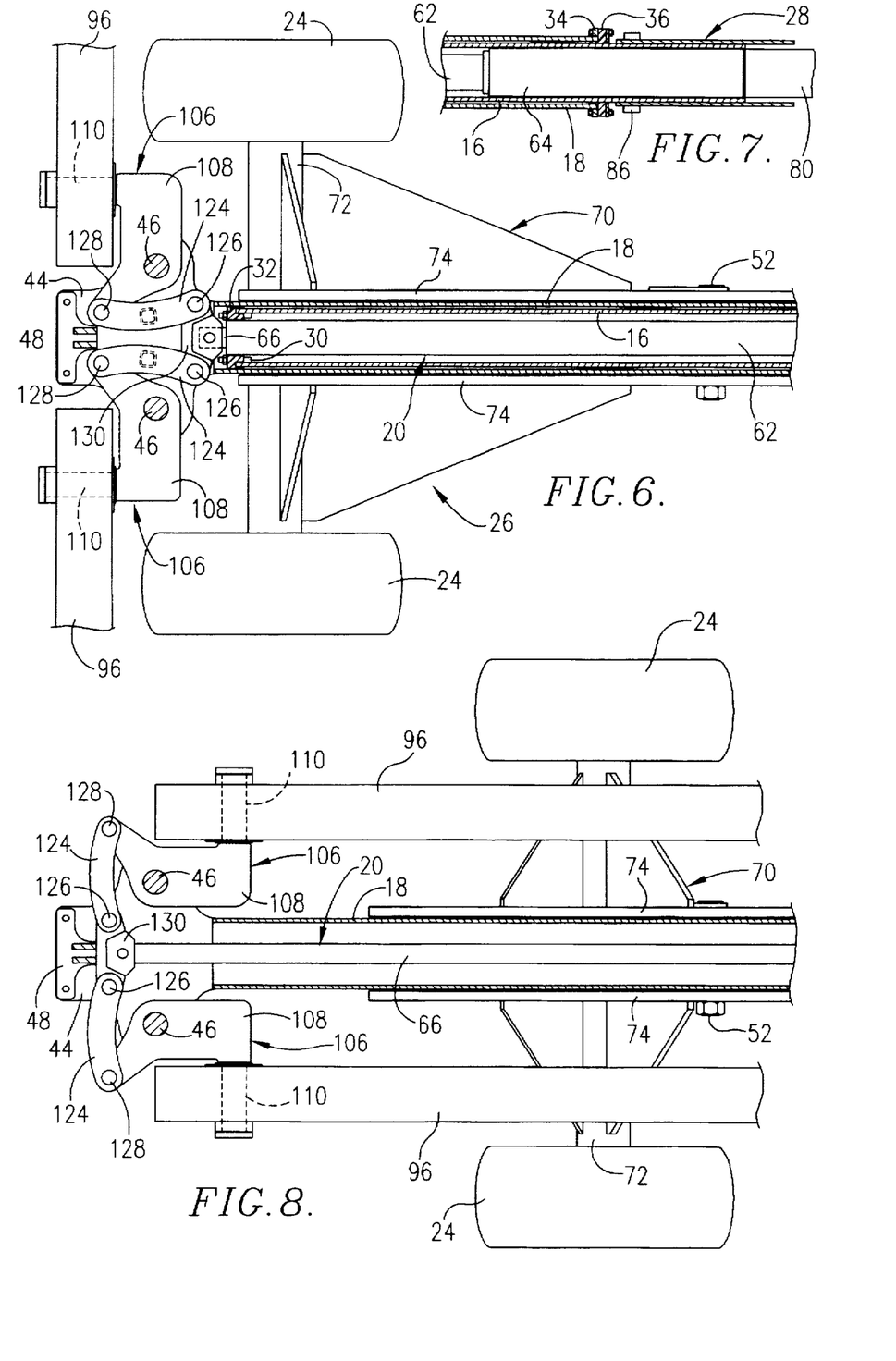
FIG. 6 is a fragmentary sectional view of the planter in the planting position, illustrating a mechanical linkage forming a part of the planter.
FIG. 7 is a fragmentary sectional view of the planter, illustrating a piston and cylinder mounting arrangement forming a part of the planter.
FIG. 8 is a fragmentary sectional view similar to FIG. 6, illustrating the planter in the transport position.

The inner tubular member 16 has a square cross-sectional shape presenting a top wall, a bottom wall, and opposed side walls. The member also presents opposed front and rear ends. As shown in FIG. 3, a mast 28 is fastened to the front end of the member 16, and includes a pair of laterally opposed plates, each secured to one of the side walls of the inner member. As shown in FIG. 6, the rear end of the inner tubular member includes a plurality of tabs 30 that protrude inward from the walls thereof, and a nylatron slide 32 is secured to the end of the member by fasteners that pass through the slide and engage the tabs 30. The slide 32 corresponds in shape to the cross-sectional shape of the inner member 16, and is received over the end of the member so that an outer section of the slide extends around the outside of the member and engages the inner surface of the outer tubular member 18 to guide shifting movement of the outer member along the inner member.

The outer tubular member 18 also has a square cross-sectional shape, and presents an inner cross-sectional area large enough to receive the inner tubular member so that the inner tubular member is received in the outer member for relative telescopic movement between a retracted position as shown in FIG. 1 and an extended position as shown in FIG. 2. The outer tubular member also includes a top wall, a bottom wall, and opposed side walls as well as opposed front and rear ends. As shown in FIG. 7, the front end of the outer member 18 includes tabs 34 that protrude radially outward from the walls thereof, and a nylatron slide 36 is secured to the front end of the member by fasteners that pass through the slide and engage the tabs. The slide 36 corresponds in shape to the cross-sectional shape of the outer member, and presents a square central opening corresponding in size to that of the inner tubular member 16 so that the slide 36 guides shifting movement of the outer tubular member along the inner tubular member. As shown in FIG. 12, a bracket 38 is secured to the outer tubular member adjacent the front end and presents a notch 40 on each side of the member that forms part of a latch, as described below.

Figure 9:
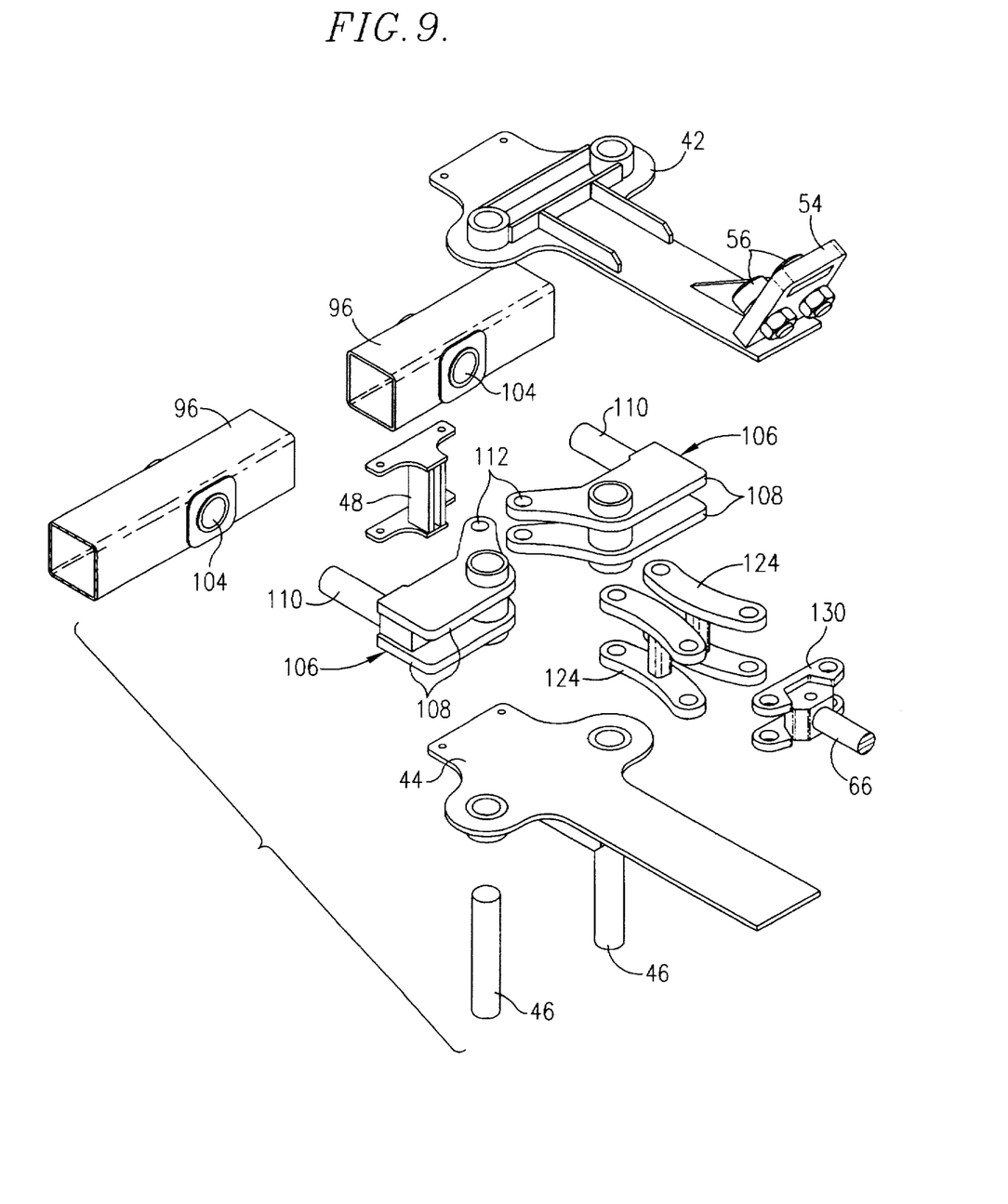
FIG. 9 is an exploded perspective view of the mechanical linkage.
Figure 10:
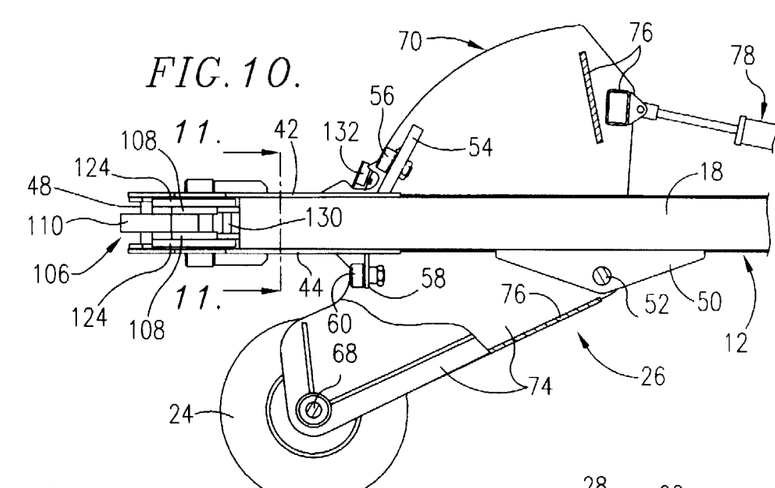
FIG. 10 is a fragmentary side elevational view of the planter, illustrating a wheel lift assembly forming a part of the planter.

As shown in FIG. 10, the rear end of the outer tubular member 18 is fitted with upper and lower hinge support plates 42, 44 that are welded or otherwise affixed to the top and bottom walls of the outer member. The support plates extend beyond the rear end of the outer tubular member and present a pair of laterally spaced, vertically extending holes through which hinge pins 46 are received, as shown in FIG. 9. A spacer 48 extends between and is connected to the upper and lower plates 42, 44 by suitable fasteners.

Figure 11:
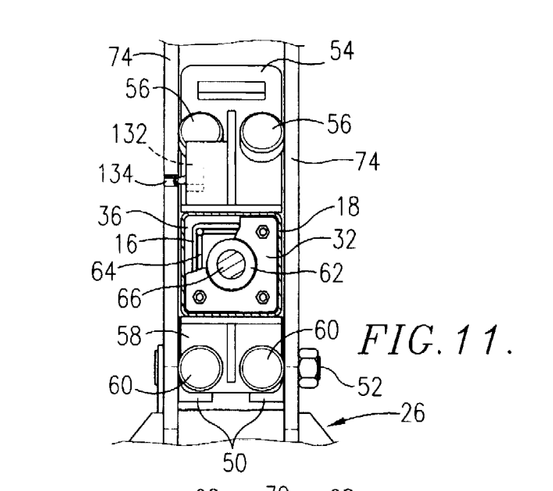
FIG. 11 is a fragmentary sectional view taken along line 11—11 of FIG. 10.

Returning to FIG. 10, a pair of laterally spaced gussets 50 depend from the bottom wall of the outer tubular member, and a hole extends horizontally through the gussets. The hole is sized for receipt of a pivot pin 52 on which the wheel lift assembly 26 is supported for pivotal movement relative to the frame. An upstanding plate 54 is secured to the top wall of the outer tubular member 18 and is supported by a triangular gusset that is welded to the top wall of the member and to the rear face of the plate. With reference to FIG. 11, a pair of laterally spaced bearing rollers 56 are secured to the plate 54 on opposite sides of the gusset, and each roller protrudes laterally beyond the adjacent side wall of the outer tubular member. A depending plate 58 is secured to the bottom wall of the outer tubular member 18 and is supported by a triangular gusset welded between the bottom wall of the member and the rear face of the plate. A second pair of laterally spaced bearing rollers 60 are secured to the plate on opposite sides of the gusset, and each roller protrudes laterally beyond the adjacent side wall of the outer tubular member.

The piston and cylinder assembly 20 is sized of a diameter small enough to permit receipt of the assembly within the inner tubular member 16 of the frame. The assembly includes a cylinder 62 that is secured to the inner tubular member at the front end by a tubular mount 64 that is secured in place within the front end of the member adjacent the mast 28, as shown in FIG. 7. The mount 64 includes an end plate to which the end of the cylinder is secured so that the cylinder is fixed in place on the inner tubular member. In addition, the assembly 20 includes a piston 66 received in the cylinder and presenting a free end that protrudes from the rear end of the cylinder, as shown in FIG. 11.

Figure 4:
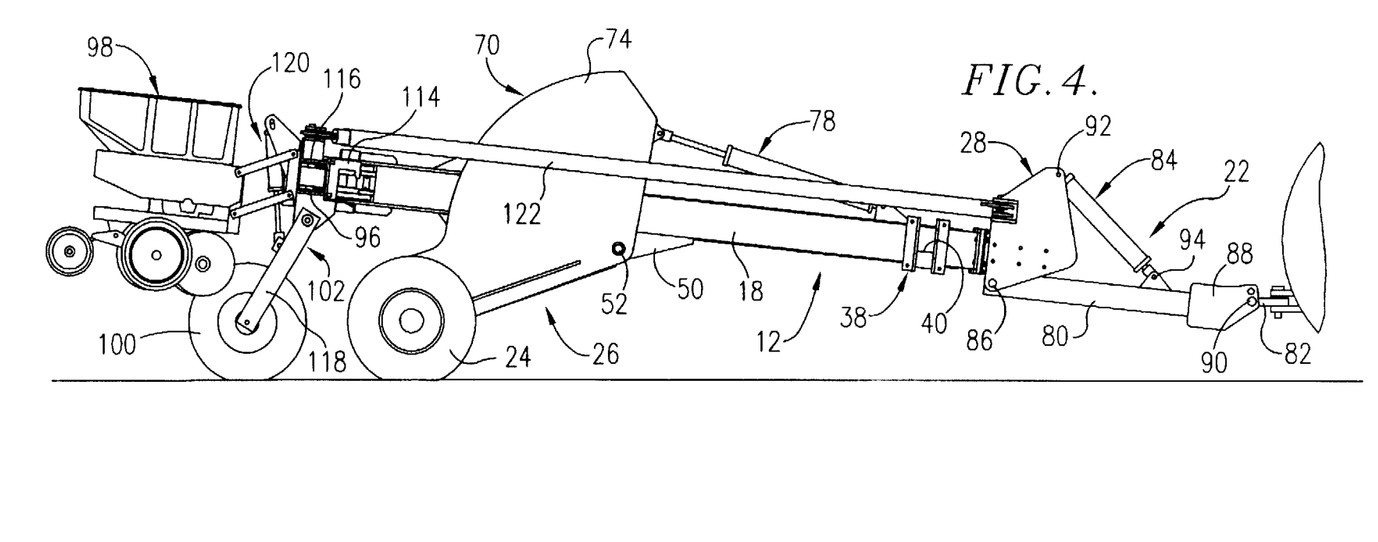
FIG. 4 is a side elevational view of the planter in a raised field position.
Figure 5:
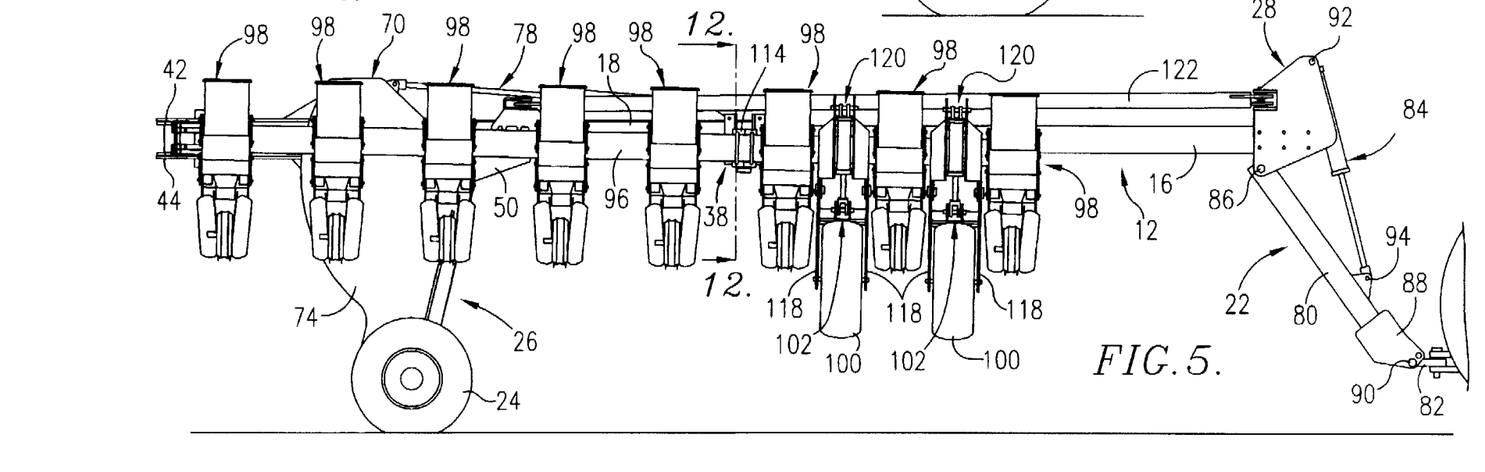
FIG. 5 is a side elevational view of the planter in the transport position.

The wheel lift assembly 26 is shown in FIG. 10, and includes the wheels 24 for supporting the planter for transportation, an axle 68 extending between and connecting the wheels together, and a carriage 70 on which the wheels are supported for rotation. The carriage includes a sleeve 72 within which the axle is supported for rotation, and a pair of laterally spaced plates 74 connected to the sleeve. The plates 74 extend along the side walls of the outer tubular member and are secured together by a number of spacers 76 that are welded between the plates. The pivot pin 52 extends through the plates 74 and supports the carriage for pivotal movement relative to the outer tubular member 18 so that the frame can be lifted relative to the wheels 24 from a lowered, planting position as shown in FIG. 3 to a raised field position as shown in FIG. 4, and to an even higher transport position, as shown in FIG. 5. The spacers 76 are located so as not to interfere with the pivotal movement of the carriage 70, and the rollers 58, 60 supported on the outer tubular member bear against the inside surfaces of the carriage plates to guide pivotal movement of the carriage and to bear any lateral forces transmitted through the carriage to the frame.

A fluid-actuated piston and cylinder assembly 78 is connected between the outer tubular member and the carriage for driving pivotal movement of the carriage to lift and lower the frame relative to the wheels 24. Preferably, as shown in FIG. 1, the cylinder of the assembly 78 is secured to the top wall of the outer tubular member 18 for relative pivotal movement, and the piston is secured for pivotal movement to one of the spacers 76 extending between the carriage plates.

As shown in FIG. 3, the hitch assembly extends forward from the mast 28 and broadly includes a hitch tube 80, a hitch 82, and a piston and cylinder assembly 84 for lifting and lowering the front end of the frame relative to the hitch. The hitch tube 80 is of square cross-sectional shape, and presents a rear end that is secured between the mast plates by a horizontally extending pin 86 about which the tube can be pivoted. The tube presents a front end provided with a pair of laterally spaced hitch plates 88 that are secured to the side walls of the tube 80, and the hitch 82 is connected between the hitch plates by a horizontally extending pin 90 about which the hitch can be pivoted. The piston and cylinder assembly 84 includes a cylinder connected between the mast plates by a horizontally extending pin 92 about which the cylinder is pivotable, and a piston connected to the tube through a horizontally extending pivot pin 94.

As shown in FIG. 2. each of the two planter assemblies 14 is a mirror image of the other, and broadly includes a tubular tool bar 96, eight planter units 98 secured to the tool bar, a pair of ground-engaging wheels 100 for supporting the planter assembly during planting, and a wheel lift assembly 102 for lifting and lowering the planter assembly in the field.

The tool bar 96 is of square cross-sectional shape, and includes inner and outer axial ends. As shown in FIG. 9, the inner end of the tool bar includes a horizontal hole 104 that extends through the tool bar in a direction transverse to the longitudinal axis of the bar. A hinge assembly 106 is secured between the tool bar and the outer tubular member of the frame, and includes a pair of vertically spaced hinge plates 108, the pin 46 extending through and connected to the plates 108 for defining a vertical pivot axis of the hinge assembly, and a horizontally extending pin 110 secured between the hinge plates and including a free end sized for receipt in the hole 104 of the tool bar 96. In addition, a vertical hole 112 extends through the hinge plates for receiving a pivot pin 128 that is parallel to but spaced to the rear of and laterally inward from the vertical pin 46, as shown in FIG. 8. The vertical pin 46 is supported by and between the upper and lower support plates 42, 44 of the frame to permit pivotal movement of the hinge assembly 106 about the vertical pin 46. The pin 110 is secured to the tool bar so that the tool bar and hinge assembly 106 move together as a unit relative to the frame about the vertical pivot pin 46.

As shown in FIG. 12, a bracket 114 is secured to each tool bar 96 at a position near the outer end, and presents a hook that is aligned with and sized for engaging one of the notches 40 presented by the bracket on the outer tubular member of the frame to form a latch. As described below, the hook engages the notch in the transport position of the planter to support the outer end of the planter assembly on the frame.

Each planter unit 98 is supported on the tool bar by a pair of U-shaped fasteners 116, shown in FIG. 1. As shown in FIG. 3, the units are of conventional construction, each including the unit itself and a 4-bar linkage connecting the unit to the fasteners so that the unit is supported on the tool bar 96 in an upright orientation and can move up and down independently of the other planter units without changing this orientation.

As shown in FIG. 4, an elongated support arm assembly 118 is connected to the tool bar 96 for relative pivotal movement about a horizontal axis, and the assembly presents a lower free end on which one of the ground-engaging wheels 100 is supported for rotation. A fluid-actuated piston and cylinder assembly 120 is connected between the tool bar and the support arm assembly 118 for pivoting the support arm assembly to lift and lower the planter assembly relative to the wheel 100. Preferably, two wheels 100 are provided on each planter assembly, and each wheel is supported by an independent support arm assembly 118 that is controlled by a separate piston and cylinder assembly 120.

As illustrated in FIG. 1, a pair of elongated trusses 122 are connected between the inner tubular member 16 of the frame and the planter assemblies 14. Each truss presents opposed axial ends, one of which is supported on the inner tubular member for relative pivotal movement, and the other of which is supported on the tool bar 96 of one of the planter assemblies for relative pivotal movement. Thus, the inner end of each tool bar is secured to the outer tubular member 18 for relative pivotal movement about the pin 46, and each tool bar is also connected to the inner tubular member 16 of the frame by one of the trusses 122. By providing this construction, relative shifting movement of the inner and outer frame members pivots the planter assemblies between a planting position, as shown in FIG. 1, wherein the tool bars extend in a direction transverse to the frame members, and a transport position, as shown in FIG. 2, wherein the tool bars are drawn alongside the frame and extend in a direction parallel to the frame members.

The piston 66 of the piston and cylinder assembly 20 is not connected directly to the outer tubular member of the frame, but rather is connected to the planter assemblies 14 through a mechanical linkage, as shown in FIG. 6. This linkage includes a pair of links 124, each connected between the piston and one of the hinge assemblies 106. Each link 124 is formed by a pair of vertically spaced arcuate plates that are connected together by a spacer, and includes a first vertical hole for receiving a pivot pin 126 for connecting the link to the piston, and a second vertical hole for receiving the pivot pin for connecting the link to the hinge assembly 106. Preferably, a block 130 is secured to the free end of the piston 66 and presents a pair of laterally spaced, vertically extending holes for receiving the pins 126. By providing this construction, actuation of the piston and cylinder assembly 20 exerts a force on the links 124 that is transmitted to the outer tubular member 18 of the frame through the hinge assemblies 106, and an accompanying moment is exerted on the hinge assemblies that urges the tool bars 96 to pivot relative to the frame between the planting and transport positions. Thus, the outer tubular member 18 is shifted relative to the inner tubular member 16 at the same time that the tool bars are pivoted relative to the frame.

In order to provide control of the primary piston and cylinder assembly 20, and the piston and cylinder assemblies 78, 84, 120 associated with the wheel lift assemblies and the hitch assembly, two of the available hydraulic outlets typically available on the tractor are required. The first outlet provides a hydraulic connection between the tractor and all of the piston and cylinder assemblies 78, 120 associated with the wheel lift assemblies 26, 102 for lifting and lowering the planter relative to the wheels 24, 100. The second outlet is connected to a circuit that provides a first hydraulic connection between the tractor and the primary piston and cylinder assembly 20 and a second hydraulic connection between the tractor and the piston and cylinder assembly 84 of the hitch assembly 22. A valve is provided in the circuit for switching between the first and second hydraulic connections, and is actuated by a switch that can be mounted in the cab of the tractor.

A flow divider is provided in the hydraulic connection between the tractor and the wheel lift piston and cylinder assemblies 78, 120 for dividing hydraulic flow between all of the piston and cylinder assemblies. However, because the piston and cylinder assembly 78 is larger than the assemblies 120 and includes a longer stroke, it is necessary to limit extension of the assembly so that the effective stroke of the assembly 78 does not exceed that of the other assemblies 120. This control of the assembly 78 is achieved through the use of a limit switch 132, shown in FIG. 11, that senses the position of the piston and cylinder assembly 78 and opens or closes a circuit when the assembly is extended by a predetermined distance slightly less than the maximum stroke length of the other assemblies. The limit switch 132 is supported on the top wall of the outer tubular member 18 and includes a roller switch that engages one of the carriage plates 74. Preferably, a notch 134 or the like is formed in the plate 74 and trips the switch when the assembly is extended the predetermined distance.

The limit switch 132 forms a part of a control circuit that normally prevents the assembly from being extended beyond the predetermined distance by shutting off the flow of hydraulic fluid to the piston and cylinder assembly 78 when the switch is tripped. Thus, it is normally only possible to lift and lower the frame and planter assemblies between raised and lowered field positions, illustrated in FIGS. 3 and 4, in which the wheels remain in contact with the ground. In the lowered field position shown in FIG. 3, the planter units 98 also engage the ground for planting. However, in the raised field position shown in FIG. 4, the planter units are lifted from the ground to enable the planter to be turned at the end of a row.

An override switch is provided in the circuit for overriding shut-off of hydraulic fluid to the piston and cylinder assembly 78 to enable the frame to be lifted beyond the raised field position into the transport position shown in FIG. 5. When the override switch is actuated, the flow of hydraulic fluid to the piston and cylinder assembly 78 continues beyond the point at which the stroke of the assembly exceeds the stroke of the assemblies 120, lifting the wheels 100 off of the ground so that the planter is supported solely by the wheels 24 of the frame.

During planting, the inner and outer tubular members 16, 18 of the frame are retracted, positioning the planter assemblies in the position shown in FIG. 1. In addition, as shown in FIG. 3, the front end of the frame is lowered relative to the hitch and the rear end of the frame is lowered relative to the wheels 24 so that the planter units 98 are in contact with the ground for planting. At the end of each row, hydraulic fluid is delivered to the piston and cylinder assemblies 78, 120 associated with the wheel lift assemblies 26, 102, raising the frame and planter assemblies on the wheels 24, 100 to lift the planter units from engagement with the ground, as shown in FIG. 4. The limit switch 132, shown in FIG. 11, is tripped when the raised field position is reached, and the control means prevents the frame from lifting the wheels 100 of the planter assemblies off of the ground. Thus, the planter assemblies remain supported by the wheels 100 and the planter may be turned to begin a new row.

In order to transport the planter, the override switch of the control means is actuated to override shut-off of hydraulic fluid to the piston and cylinder assembly 78 to enable the frame to be lifted beyond the raised field position into the transport position shown in FIG. 5. Thereafter, the primary piston and cylinder assembly 20 is extended, exerting an axial force that is transmitted to the outer tubular member 18 through the hinge assemblies 106, extending the outer tubular member relative to the inner tubular member. This extension of the frame causes the planter assemblies 14 to be drawn in toward the frame by the trusses 122. At the same time, extension of the assembly 20 exerts a moment on the hinge assemblies 106, driving pivotal movement of the tool bars 96 about the pivot pins 46. The moment exerted on the hinge assemblies 106 completes movement of the planter assemblies to the transport position shown in FIG. 2, assisting the trusses in achieving complete nesting of the planter assemblies against the frame so that the hooks defined by the brackets 114 on the planter assemblies are brought against the brackets 38 on the outer tubular member and the tool bars are parallel to the members.

Once movement of the planter assemblies 14 to the transport position is complete, the front end of the frame is lifted relative to the hitch through actuation of the piston and cylinder assembly 84 of the hitch assembly 22. During this movement of the frame, the notches 40 are raised into engagement with the hooks defined by the brackets 114, as shown in FIG. 12, to lift and support the outer ends of the planter assemblies on the frame, and the ends of the planter assemblies are lifted completely off of the ground for transportation. As shown in FIG. 8, the links 124 between the piston and cylinder assembly 20 and the hinge assemblies 106 exert a moment on the hinge assemblies that inhibits the assemblies from being swung from the transport position. Thus, the planter assemblies are effectively locked for transportation, and it is necessary to retract the piston and cylinder assembly 20 in order to return the planter assemblies to the planting position.

Although the present invention has been described with reference to the preferred embodiment, it is noted that equivalents may be employed and substitutions made herein without departing from the scope of the invention as recited in the claims.

What is claimed is:

1. A folding planter comprising:
   a frame presenting a longitudinal axis and including first and second frame members supported for longitudinal shifting movement relative to one another;
   a primary fluid-actuated piston and cylinder assembly for shifting the first and second frame members between retracted and extended positions;
   a pair of planter assemblies each supported on the second frame member for pivotal movement about a vertical pivot axis between a planting position and a transport position, each planter assembly including a tool bar that extends transverse to the longitudinal axis of the frame in the planting position and parallel to the frame in the transport position, and a plurality of planting units supported on the tool bar;
   a pair of elongated trusses connected between the first frame member and the planter assemblies, each truss presenting opposed ends supported for pivotal movement relative to the first frame member and one of the planter assemblies to permit the planter assembly to be moved by the truss between the planting and transport positions upon actuation of the primary piston and cylinder assembly; and
   a mechanical linkage connected between the primary piston and cylinder assembly and the planter assemblies for driving pivotal movement of the planter assemblies upon actuation of the primary piston and cylinder assembly to assist the trusses in moving the planter assemblies completely into and out of the transport position.

2. A planter as recited in claim 1, wherein the first and second frame members are tubes, one of which is received in the other for relative telescopic movement, the primary piston and cylinder assembly being supported within the tubes and including a piston and a cylinder telescopically interfitted with the piston with the piston being secured to one of the tubes and the cylinder being connected to the other of the tubes.

3. A planter as recited in claim 1, wherein each planter assembly includes a hinge secured to the tool bar and defining the vertical pivot axis of the planter assembly, the linkage being connected to the hinge for relative pivotal movement about a second vertical pivot axis parallel to and spaced from the vertical pivot axis of the planter.

4. A planter as recited in claim 1, wherein each planter unit is supported on the tool bar in an upright orientation by a four-bar linkage which permits the height of the planter unit to vary relative to the tool bar without changing the upright orientation.

5. A planter as recited in claim 1, further comprising a latch means for latching the planter assemblies and the frame together in the transport position to support the planter assemblies during transport.

6. A planter as recited in claim 1, further comprising a first set of ground-engaging wheels for supporting the frame, a wheel lift assembly connected between the frame and the first set of wheels for permitting the frame to be lifted and lowered relative to the wheels, and a first fluid-actuated, piston and cylinder lift drive assembly having a first end connected to the second frame member and a second end connected to the wheel lift assembly for driving the relative lifting and lowering movement.

7. A planter as recited in claim 6, wherein each planter assembly includes an elongated support arm connected to the tool bar for relative pivotal movement about a horizontal axis, a second set of ground-engaging wheels secured to the support arm for rotational movement, and a second fluid-actuated, piston and cylinder lift drive assembly connected between the tool bar and the support arm for lifting and lowering the tool bar relative to the second set of wheels.

8. A planter as recited in claim 7, further comprising control means for coordinating operation of the first and second lift drive assemblies.

9. A planter as recited in claim 8, wherein the first lift drive assembly defines a stroke longer than the stroke defined by the second lift drive assembly, the control means comprising a sensing means for sensing the stroke of the first lift drive assembly and providing a signal when the first lift drive assembly is extended by a distance about equal to the stroke of the second lift drive assembly, a safety circuit responsive to the signal for normally preventing the first lift drive means from being extended further upon receipt of the signal from the sensing means, and an override switch for overriding the safety circuit and allowing the first lift drive means to be extended beyond the stroke of the second lift drive means to lift the planter to a transport position in which the second set of wheels are lifted off of the ground and the planter is supported by the first set of wheels.

10. A planter as recited in claim 1, further comprising a hitch arm connected to the frame for pivotal movement about a first horizontal axis, a hitch supported on the hitch arm for pivotal movement about a second horizontal axis, and a secondary and cylinder assembly connected between the frame and the hitch arm for raising and lowering the frame relative to the hitch.

* * * * *